H. RYDER.
Improvement in Belaying-Cleats.
No. 131,974. Patented Oct. 8, 1872.
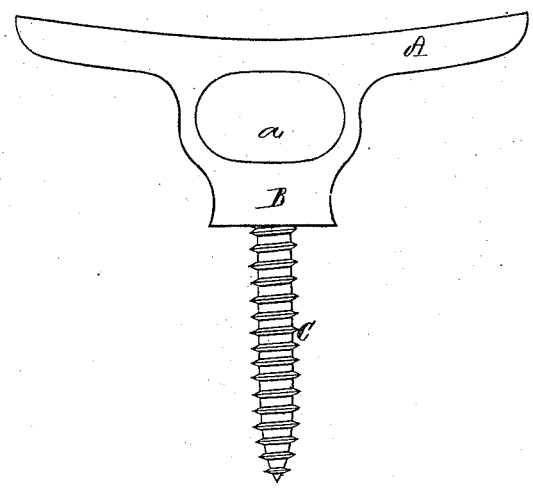
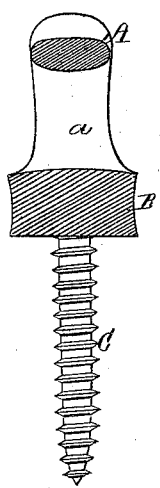

UNITED STATES PATENT OFFICE.

HENRY RYDER, OF SOMERVILLE, MASSACHUSETTS.

IMPROVEMENT IN BELAYING-CLEATS.

Specification forming part of Letters Patent No. 131,974, dated October 8, 1872.

*To all whom it may concern:*

Be it known that I, HENRY RYDER, of Somerville, of the county of Middlesex and State of Massachusetts, have invented a new and useful Improvement in Belaying-Cleats; and do hereby declare the same to be fully described in the following specification and represented in the accompanying drawing, of which—

Figure 1 is a side view, and Fig. 2 a transverse section of one of my improved cleats.

The nature of my invention consists in a belaying-cleat provided or made with a lateral passage extending through its shank, the same being to receive a line or rope. Also, so made and furnished with a single screw projecting from the shank in order to enable the cleat to be fixed in the gunwale of a boat, or in a post, mast, or other article to which it may be desirable to apply the cleat.

In the drawing, A denotes the head, B the shank, and C the screw of the cleat, the hole or passage through the shank being exhibited at $a$.

With a cleat so made the sheet or hauling rope of a sail may be run through the lateral passage and knotted at its end, in which case the passage will serve to keep the rope in connection with the cleat, and from being blown out of reach of a seaman. The passage is also useful in belaying a rope, as it enables the rope to be run through, as well as coiled around, the shank, thereby securing the rope to better advantage than can be effected by a shank without any such hole.

I claim—

A belaying-cleat, provided with a lateral passage, $a$, through its shank, and the single screw fixed in and extended from the shank, as represented.

HENRY RYDER.

Witnesses:
R. H. EDDY,
J. R. SNOW.